United States Patent [19]

Eyrainer

[11] Patent Number: 5,722,685
[45] Date of Patent: Mar. 3, 1998

[54] GAS BAG LATERAL IMPACT PROTECTIVE DEVICE

[75] Inventor: Heinz Eyrainer, Waldstetten, Germany

[73] Assignee: TRW Occupant Restraint Systems GmbH, Alfdorf, Germany

[21] Appl. No.: 735,346

[22] Filed: Oct. 22, 1996

[30] Foreign Application Priority Data

Nov. 2, 1995 [DE] Germany ............... 295 17 372 U

[51] Int. Cl.$^6$ ............................................. B60R 21/22
[52] U.S. Cl. .................... 280/730.2; 280/730.1; 280/729
[58] Field of Search ............... 280/730.2, 730.1, 280/729, 728.1, 743.1, 743.2

[56] References Cited

U.S. PATENT DOCUMENTS

| | | | |
|---|---|---|---|
| 5,324,072 | 6/1994 | Olson et al. | 280/730.2 |
| 5,380,038 | 1/1995 | Hawthorn et al. | 280/730.1 |
| 5,439,247 | 8/1995 | Kolb | 280/730.2 |
| 5,496,061 | 3/1996 | Brown | 280/730.2 |
| 5,556,128 | 9/1996 | Sinnhuber et al. | 280/730.2 |
| 5,586,782 | 12/1996 | Zimmerman, II et al. | 280/730.2 |
| 5,609,363 | 3/1997 | Finelli | 280/743.2 |

FOREIGN PATENT DOCUMENTS

| | | |
|---|---|---|
| 0653335 | 5/1995 | European Pat. Off. . |
| 0714818 | 11/1995 | European Pat. Off. . |
| 4430412 | 10/1995 | Germany . |
| 6227348 | 2/1993 | Japan ............... 280/730.2 |
| 5139232 | 6/1993 | Japan ............... 280/730.2 |
| 6227348 | 8/1994 | Japan . |
| 6298027 | 10/1994 | Japan . |

OTHER PUBLICATIONS

Research Disclosure, XP 000599747, Side Impact Air Bag And Method For Folding, (38549) May 1996.

Research Disclosure, XP 000599723, Side Impact Air Bag, (38524) May 1996.

*Primary Examiner*—Christopher P. Ellis
*Attorney, Agent, or Firm*—Tarolli, Sundheim, Covell, Tummino & Szabo

[57] ABSTRACT

A gas bag lateral impact protective device for vehicle occupants is provided, which is integrated in a vehicle door. The gas bag lateral impact protective device comprises a compressed gas source, a thorax protecting gas bag and a head protecting gas bag provided at said thorax protecting gas bag. The thorax protecting gas bag and the head protecting gas bag are intended to be inflated by the compressed gas source and deploy, upon inflation, in a space to the side of the vehicle door, the head protecting gas bag deploying above the thorax protecting gas bag.

8 Claims, 4 Drawing Sheets

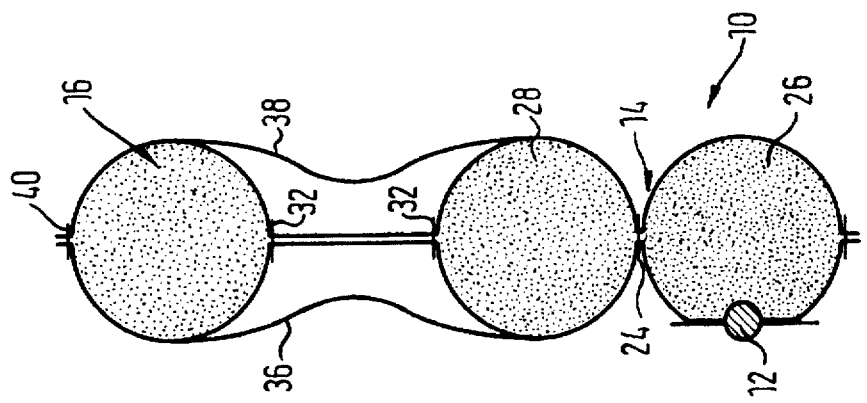
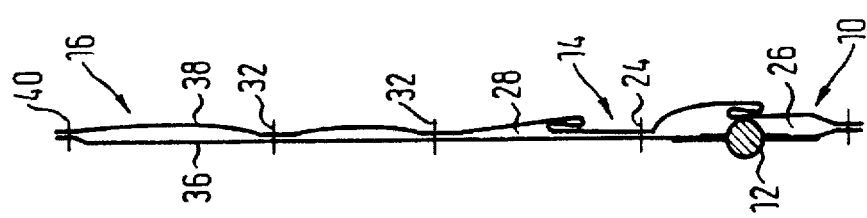
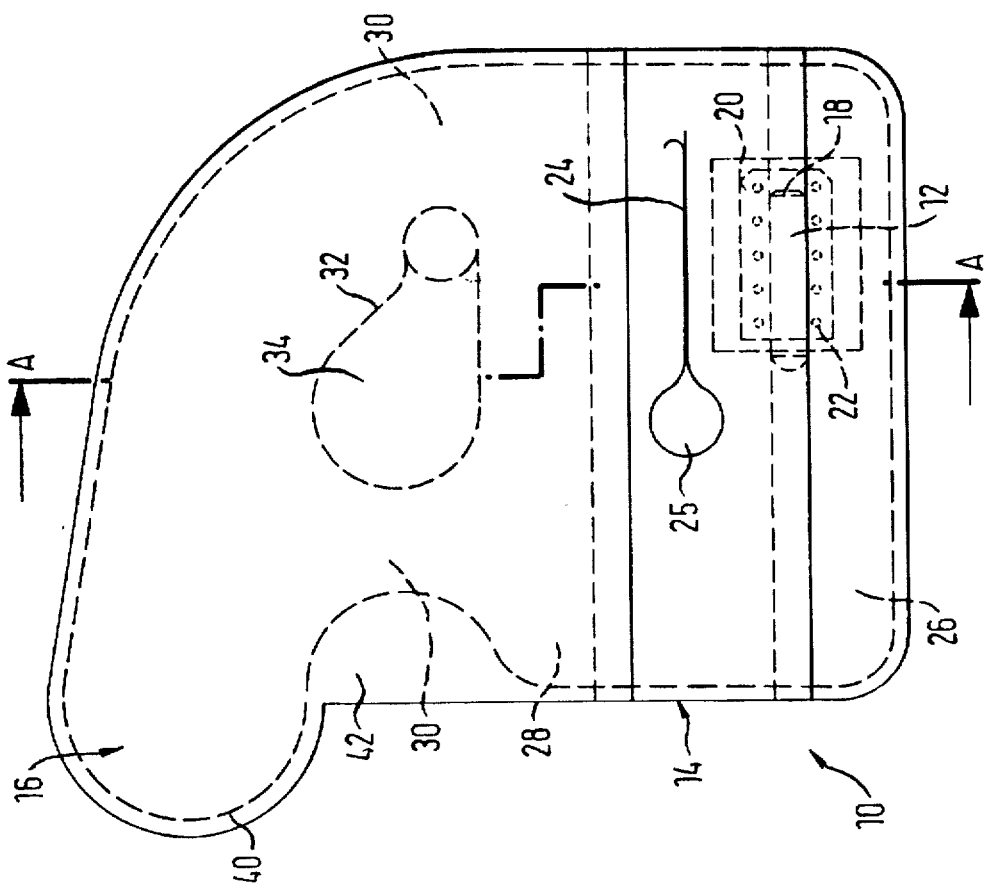

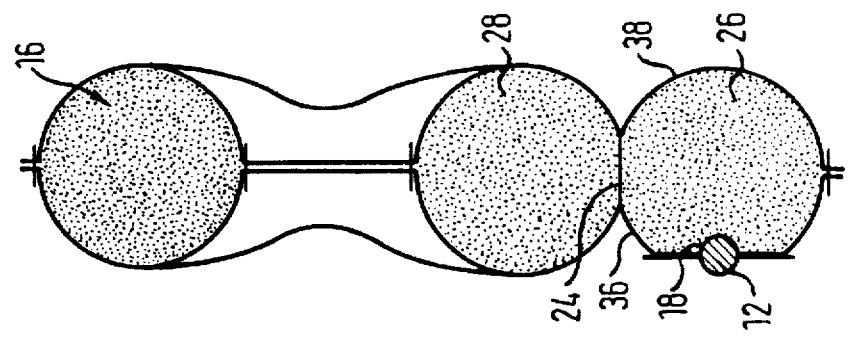
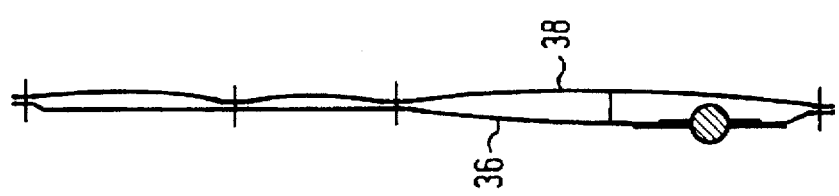
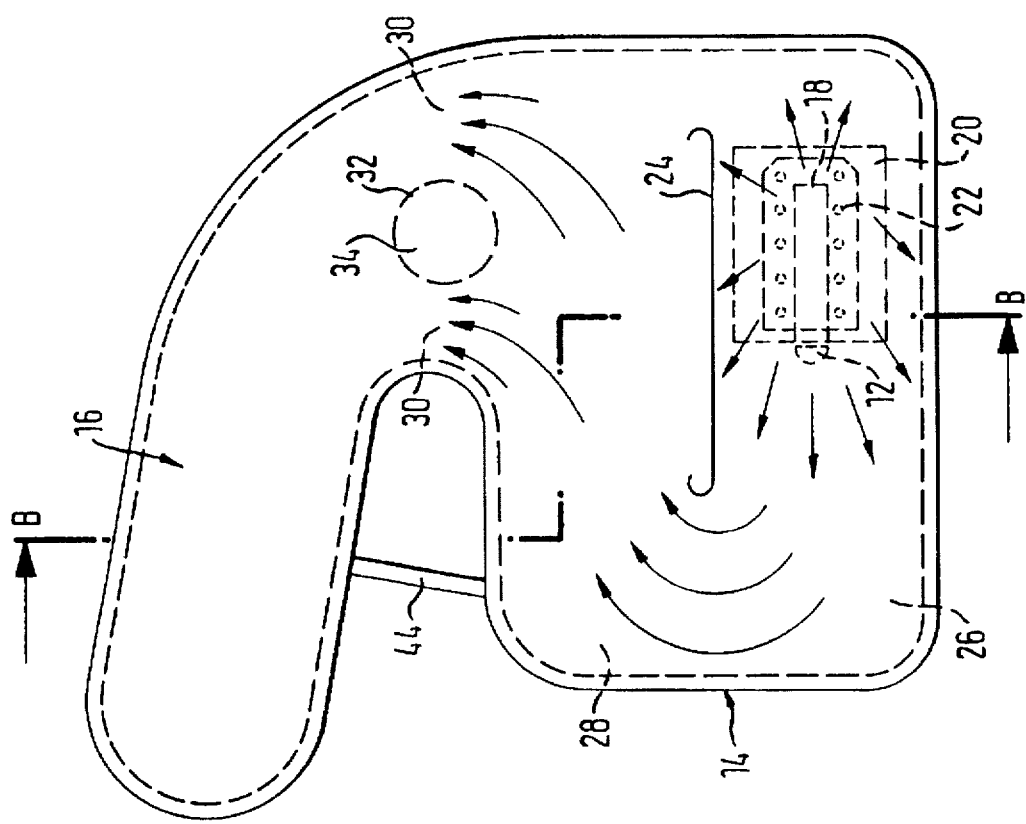

GAS BAG LATERAL IMPACT PROTECTIVE DEVICE

TECHNICAL FIELD

The invention relates to a gas bag lateral impact protective device for vehicle occupants.

BACKGROUND OF THE INVENTION

Such a protective device serves to prevent, in case of a lateral impact, contact between the vehicle occupant and parts of the vehicle such as the B column or the inner side of the door or with objects intruding into the vehicle particularly in the region of the head of the vehicle occupant, possibly through the lateral window, such objects being another vehicle or a post, for example. However the head region has so far not been sufficiently protected by such a gas bag, because the upward deployment of the gas bag was obstructed by the safety belt. Furthermore, with known lateral impact gas bags having the shape of a generally rectangular cushion it is, if at all, only possible to timely and suitably fill the gas bag by means of an unreasonably large compressed gas source, due to the resulting high volume of the gas bag.

BRIEF SUMMARY OF THE INVENTION

The invention provides a gas bag lateral impact protective device for vehicle occupants, which is integrated in a vehicle door. The gas bag lateral impact protective device comprises a compressed gas source, a thorax protecting gas bag and a head protecting gas bag connected to the thorax protecting gas bag. The thorax protecting gas bag and the head protecting gas bag are intended to be inflated by the compressed gas source and deploy, upon inflation, in a space to the side of the vehicle door, the head protecting gas bag deploying above the thorax protecting gas bag. Accordingly in addition to the protective action of the thorax protecting gas bag a specific protective action is provided for the head of the vehicle occupant, the separation of the thorax protecting gas bag and the head protecting gas bag meaning the latter may be inflated in an optimum fashion for the particular form of installation and consequently may not be hindered, more particularly by the safety belt.

Further advantageous developments of the invention are defined in the dependent claims.

BRIEF DESCRIPTION OF THE DRAWINGS

The invention will now be described with reference to the accompanying drawings.

FIG. 2 is a diagrammatic lateral elevation of the protective device of FIG. 1.

FIG. 3 shows a sectional view along the line A—A of FIG. 2, the gas bags not being under pressure.

FIG. 4 is a view corresponding to that of FIG. 3, the gas bags being under pressure.

FIG. 6 is a diagrammatic lateral elevation of the protective device of FIG. 5.

FIG. 7 is a sectional view along the line B—B of FIG. 6, the gas bags not being under pressure.

FIG. 8 is a view corresponding to that of FIG. 7 with the gas bags under pressure.

DETAILED DESCRIPTION OF THE INVENTION

Figure 1:
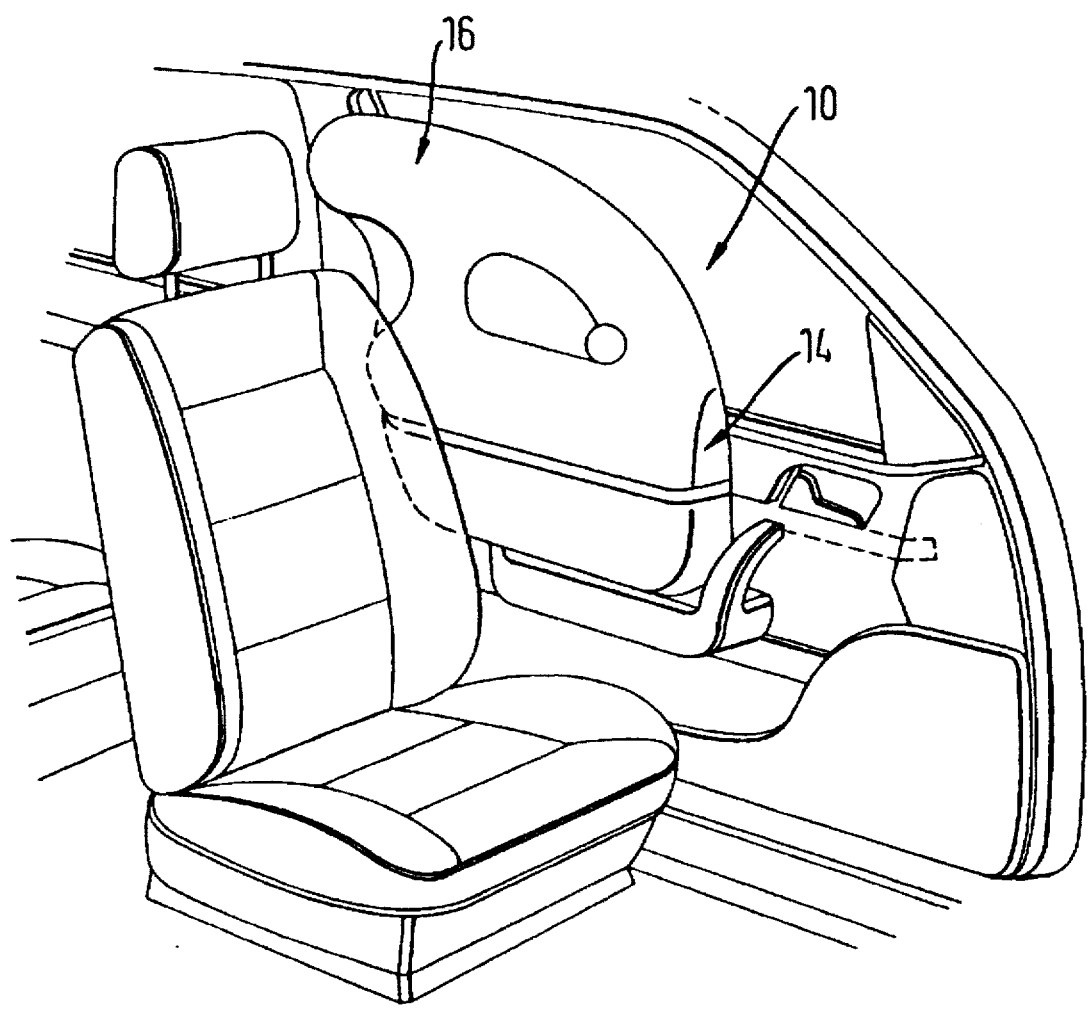
FIG. 1 is a diagrammatic representation of a first embodiment of a protective device in accordance with the invention with a thorax protecting gas bag and a head protecting gas bag in the deployed state.

In FIGS. 1 through 4 the reader will perceive a first embodiment of a lateral impact gas bag protective device 10 in accordance with the invention. Such device has as its principal parts a compressed gas source 12, a thorax protecting gas bag 14 connected with same for fluid flow therebetween and a head protecting gas bag 16, which is arranged as a sort of independent chamber on the thorax protecting gas bag. In the inactive state the two gas bags are folded up in a space saving manner so that the entire protective device is arranged behind the cladding of a vehicle door diagrammatically illustrated in FIG. 1. When needed the compressed gas source 12 may be fired by a sensor triggering system (not illustrated) so that a certain quantity of gas under pressure is released. Such gas causes the two gas bags to be inflated with the result that they emerge from the cladding and deploy to the side of the vehicle door. The arrangement of the two gas bags in the deployed state is also to be seen in FIG. 1.

The compressed gas source 12 may be any desired gas generator, which is capable of supplying the necessary quantity of compressed gas within the time generally available for inflation of the two gas bags. Such compressed gas sources are known in the field of vehicle occupant restraining systems. The compressed gas source 12 possesses a diagrammatically represented outlet opening 18, whose peripheral portion is connected with the peripheral portion 20 of an inflation opening of the thorax protecting gas bag 14 by diagrammatically illustrated attachment elements 22.

The thorax protecting gas bag 14 is divided by a dividing seam 24 into a first chamber 26 and a second chamber 28, such seam sewing off one fabric part 25. The inflation opening is in the first chamber of the thorax protecting gas bag 14. In the second chamber 28 of the thorax protecting gas bag 14 an outlet opening 30 is formed, which coincides with an inlet opening of the head protecting gas bag. A sewing-off seam 32 is provided in the region of the outlet opening 30, a fabric part 34 being sewn off by said seam 32. Accordingly the cross sectional area of the outlet opening 30 or, respectively, the inlet opening is reduced.

Due to the dividing seam 24 and the sewing-off seam 32 the two chambers of the thorax protecting gas bag 14 and of the head protecting gas bag 16 assume a generally cylindrical configuration, the two chambers of the thorax protecting gas bag 14 being connected together at their axial ends and the head protecting gas bag 16 being connected with the second chamber 18 of the thorax protecting gas bag 14 via the outlet opening 30. It is an advantage if the two gas bags 14 and 16 are made integrally by connecting together two flaps 36 and 38 of fabric by a peripheral seam 40. The peripheral seam 40 also serves to sew off a fabric area 42, which in the inflated state of the gas bags stabilizes the head protecting gas bag 16 with respect to the thorax protecting gas bag 14. Since such a fabric area can obviously only have a stabilizing action in the case of a tension load, the head protecting gas bag 16 will, owing to the configuration of the peripheral seam 40 and of the sewing-off seam 32, in terms of FIG. 2 tend to move upward away from the thorax protecting gas bag 14 at the fabric area 42, when the two gas bags 14 and 16 are inflated.

The inflation of the two gas bags takes place in the following fashion: after firing of the compressed gas source 12 same produces gas under pressure, which flows into the first chamber 26 of the thorax protecting gas bag 14. When this occurs the door cladding breaks open at a predetermined breaking point so that the gas bags are able to emerge from the door cladding. The gas produced by the compressed gas source 12 will flow out from the first chamber 26 into the second chamber 28 and from same into the head protecting gas bag 16. Owing to the dividing seam 24 and the sewing-off seam 32 the flow behavior of the gas produced by the compressed gas source 12 is so affected that the thorax protecting gas bag 14 will completely deploy before the head protecting gas bag 16 is completely deployed. This timing of the deployment of the two gas bags takes into account the geometrical and kinematic features during a lateral impact. Since the upper body of a vehicle occupant is placed nearer to the door than his head the upper body of a vehicle occupant, in the case of a lateral impact, will strike the thorax protecting gas bag 14 before his head strikes the head protecting gas bag 16. By having a suitable design of the seams 24 and 32 it is possible to set the desired internal bag pressure in the two chambers 26 and 28 of the thorax protecting gas bag 14 during the inflation of the two gas bags. Furthermore, the gas volume displaced from the thorax protecting gas bag 14 when the upper body of the vehicle occupant plunges into it may be additionally utilized for filling the head protecting gas bag 16.

The gas bag lateral impact protective device in accordance with the invention attains the following advantages: in the case of lateral impact there is in addition to the protective action for the upper body of the vehicle occupant also a protective action for the head. For this purpose no additional components are required; it is merely necessary for the fabric parts from which so far a thorax protecting gas bag has been manufactured, to be cut out and sewn in a different manner. Moreover, no additional compressed gas source is necessary, which would lead to increased noise for the occupant, more particularly if it is arranged near his head, as is necessary in the case of protective devices which require a separate gas bag, for example on the upper door frame. Owing to the division of the thorax protecting gas bag 14 into two essentially cylindrical chambers 26 and 28 and owing to the design of the head protecting gas bag 16 also as an essentially cylindrical chamber, an optimum protective action is produced, while simultaneously having a comparatively small volume of the gas bags 14 and 16. This is something having a favorable effect on the size of the compressed gas source required and on the inflation time for the two gas bags. The head protecting gas bag 16 may without any difficulty be so designed that in the inflated state it extends sufficiently far to the rear as far as the B column so that a protective action is developed for the vehicle occupant's head in all the occupant's positions. Owing to the separation of the thorax protecting gas bag from the head protecting gas bag the latter may deploy substantially independently from the thorax protecting gas bag so that a safety belt extending between the B column and the upper body of the vehicle occupant will not obstruct deployment of the head protecting gas bag 16. It is an advantage if the head protecting gas bag 16 is so designed that its height increases toward the B column. This will take into account the relationship, usually applying, between the position of the vehicle seat and the position of the head of a vehicle occupant: a tall vehicle occupant, whose head is at a comparatively high level, will normally prefer a position with the vehicle seat pushed to the rear, whereas a short vehicle occupant, whose head is, comparatively speaking, further down, will prefer a position with the vehicle seat moved forward.

Figure 5:
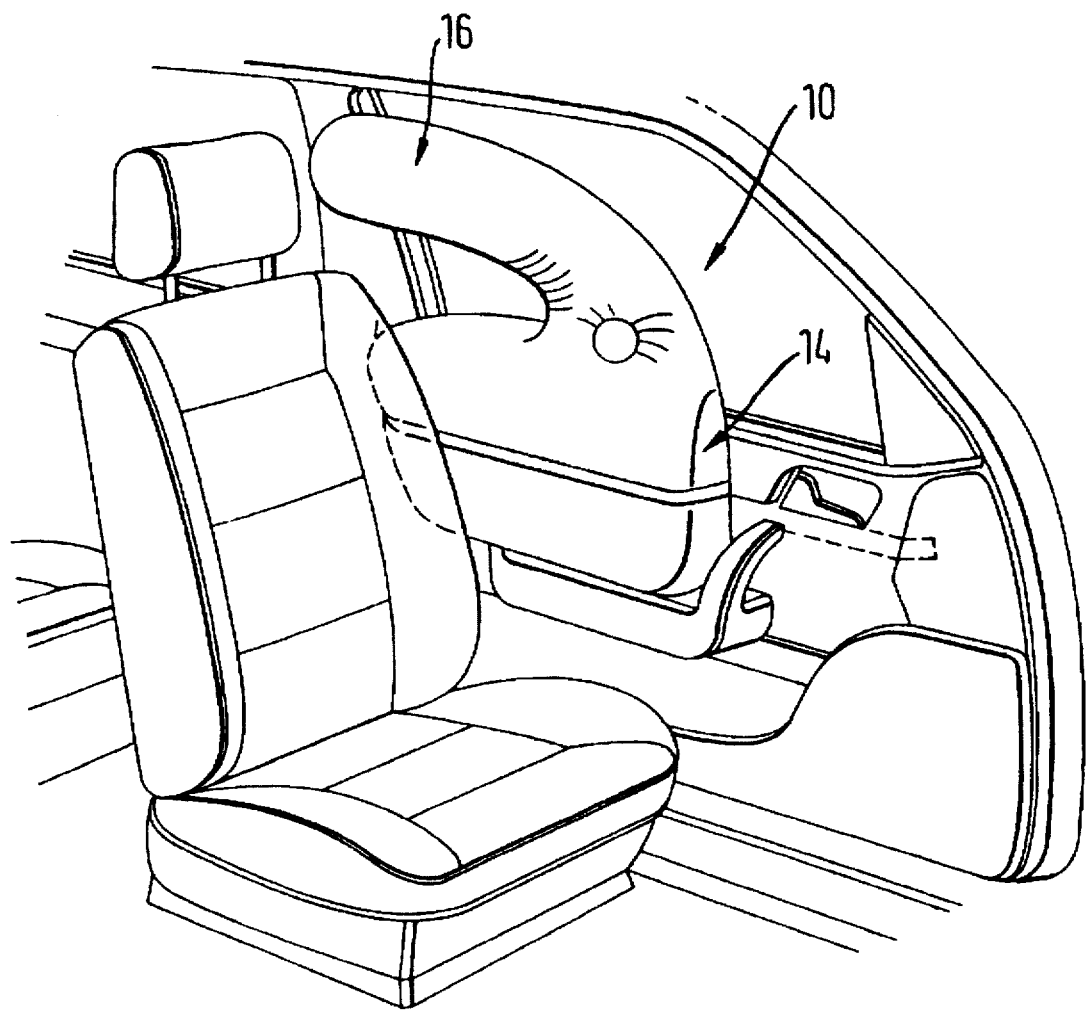
FIG. 5 is a diagrammatic representation of a second embodiment of a protective device in accordance with the invention with a thorax protecting gas bag and a head protecting gas bag in the deployed state.

In FIGS. 5 through 8 a second embodiment of a gas bag lateral impact protective device in accordance with the invention is shown. In these figures the same reference numerals applying for the first embodiment are employed in this case as well. Since the two embodiments are identical as regards important parts thereof, the following description will be limited to parts of the second embodiment differing from the first embodiment.

One difference is that the dividing seam 24 is so made in the second embodiment that no fabric part 25 is sewn off. The result of this is that the overall volume of the thorax protecting gas bag 14 is greater than in the first embodiment. A further difference is to be seen in the form of the sewing-off seam 32. In the second embodiment such seam only sews off a comparatively small fabric part 34 so that assuming the same cross sectional area of the outlet opening 30 the same will (as regards FIGS. 1 and 5) in the case of the second embodiment be shifted further to the right than in the first embodiment. Accordingly there will be a pronounced cylindrical configuration of the head protecting gas bag 16. Instead of the fabric area 42 a tethering strap 44 is employed for stabilizing the head protecting gas bag 16 in relation to the thorax protecting gas bag 14.

I claim:

1. A gas bag lateral impact protective device for vehicle occupants, which is integrated in a vehicle door and comprises a compressed gas source, a thorax protecting gas bag and a head protecting gas bag connected to said thorax protecting gas bag, said thorax protecting gas bag and said head protecting gas bag being intended to be inflated by said compressed gas source and deploying, upon inflation, in a space to the side of said vehicle door, said head protecting gas bag deploying above said thorax protecting gas bag, said head protecting gas bag being in fluid communication with said thorax protecting gas bag, said thorax protecting gas bag having an outlet opening interconnected with an inlet opening of said head protecting gas bag, a sewing-off seam being provided in the region of said outlet opening so that the cross sectional area of said outlet opening is reduced, a dividing seam being provided on said thorax protecting gas bag, said dividing seam being in the fluid path from said compressed gas source to said outlet opening.

2. The gas bag lateral impact protective device as claimed in claim 1, wherein said head protecting gas bag is in fluid communication with said thorax protecting gas bag.

3. The gas bag lateral impact protective device as claimed in claim 2, wherein said thorax protecting gas bag is provided with an outlet opening interconnected with an inlet opening of said head protecting gas bag.

4. The gas bag lateral impact protective device as claimed in claim 3, wherein a sewing-off seam is provided in the region of said outlet opening so that the cross sectional area of said outlet opening is reduced.

5. The gas bag lateral impact protective device as claimed in claim 1, wherein said dividing seam divides said thorax protecting gas bag into a first and a second chamber, which are connected for fluid flow, said compressed gas source being connected for fluid flow with said first chamber and said outlet opening being arranged in said second chamber.

6. The gas bag lateral impact protective device as claimed in claim 1, wherein said head protecting gas bag is formed integrally with said thorax protecting gas bag.

7. The gas bag lateral impact protective device as claimed in claim 1, wherein a sewn-off fabric area is provided for stabilizing said head protecting gas bag with respect to said thorax protecting gas bag.

8. The gas bag lateral impact protective device as claimed in claim 1, wherein at least one tethering strap is provided for stabilizing said head protecting gas bag with respect to said thorax protecting gas bag.

* * * * *